United States Patent
Santanam

(10) Patent No.: US 6,867,395 B2
(45) Date of Patent: Mar. 15, 2005

(54) VARIABLE FLOW THERMOSTAT AND METHOD FOR VARIABLY CONTROLLING ENGINE TEMPERATURE

(75) Inventor: Chandran Bhala Santanam, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 182 days.

(21) Appl. No.: 10/277,355

(22) Filed: Oct. 22, 2002

(65) Prior Publication Data

US 2004/0074894 A1 Apr. 22, 2004

(51) Int. Cl.[7] ................................................. H05B 1/02
(52) U.S. Cl. ....................... 219/494; 219/491; 219/202; 219/515; 219/567; 123/41.1; 236/34.5
(58) Field of Search ................................. 219/494, 497, 219/509, 511, 202, 501, 489, 490; 123/41.1; 236/34.5

(56) References Cited

U.S. PATENT DOCUMENTS

| | | | | |
|---|---|---|---|---|
| 3,782,121 A | * | 1/1974 | Marcoux et al. | 60/527 |
| 4,399,776 A | * | 8/1983 | Shikata | 123/41.08 |
| 4,452,184 A | * | 6/1984 | Vollmer | 122/504.1 |
| 5,025,627 A | * | 6/1991 | Schneider | 60/527 |
| 6,192,684 B1 | * | 2/2001 | McBirney | 60/528 |
| 2003/0196612 A1 | * | 10/2003 | Le Lievre et al. | 123/41.1 |
| 2004/0083987 A1 | * | 5/2004 | Manners et al. | 123/41.1 |

* cited by examiner

Primary Examiner—Mark Paschall
(74) Attorney, Agent, or Firm—Christopher DeVries

(57) ABSTRACT

A variable flow thermostat, as applied to an internal combustion engine, provides a means for allowing the flow of coolant fluid from the engine block to the radiator to vary in response to the temperature of the engine coolant sensed at the engine block. The thermostat includes a central control unit that responds to changes in engine coolant temperature by sending signals to one of a plurality of control heaters, each in contact with block of a controllably expandable medium. These blocks, when heated by the control heaters, will heat and expand, exerting a force that controls the degree to which a valve opens. The valve controls the flow of coolant fluid from the engine to either a radiator or a bypass conduit. By varying how many blocks of material are heated, the position of the valve, and thus the amount of coolant reaching the radiator, can be varied.

20 Claims, 2 Drawing Sheets

VARIABLE FLOW THERMOSTAT AND METHOD FOR VARIABLY CONTROLLING ENGINE TEMPERATURE

TECHNICAL FIELD

This invention relates generally to a variable flow thermostat and to a method for providing a variable flow of fluid in response to a sensed change in temperature, and more specifically to an electrically-controlled variable flow thermostat and to a method for use of such a thermostat for variably controlling temperature in an internal combustion engine.

BACKGROUND OF THE INVENTION

Internal combustion engines (ICE) currently employ one of several different thermostat designs that control the flow of coolant from the engine block to the radiator. All of these designs, while different in operation, work by the same principle. When the engine coolant reaches a prescribed temperature (for example, 90° C.), the thermostat opens and allows coolant to flow from the engine block to the radiator. All of the current engine thermostats are of an on/off nature by design; either the thermostat is fully open and allows coolant to flow, or it is closed and prohibits flow. With such thermostats, there is no way to alter or vary the amount of coolant flowing from the engine to the radiator based upon engine coolant temperature.

In some applications, for example to improve engine efficiency and especially to reduce undesirable engine emissions upon engine start up, it may be advantageous to vary the flow of coolant fluid based on engine temperature to thereby vary the engine temperature within a desirable range. Such a variable flow is not possible with present thermostats. Accordingly, a need exists for a variable flow thermostat and for a method for variably controlling the temperature of an internal combustion engine.

BRIEF DESCRIPTION OF THE DRAWINGS

The invention will be understood after review of the following description considered together with the drawings in which.

Reference is made in the description, and with reference to the figures, to terms such as "up," "down," "upward," "downward," "upper," "vertical," and the like. Such terms are used only to facilitate description of the invention and are not to be taken as limiting. As those of skill in the art will appreciate, a variable flow thermostat in accordance with the invention may be operated in any spatial orientation.

DESCRIPTION OF THE PREFERRED EMBODIMENT

Current thermostats for use in an internal combustion engine (ICE) work by preventing the flow of coolant from the engine block to the radiator until a preset temperature at the engine coolant is reached, at which temperature the thermostat (or a valve coupled to the thermostat) opens and allows the flow of coolant from the engine block to the radiator to regulate the engine temperature. There is no provision in current designs of ICE thermostats to provide for a variable flow of coolant from the engine block to the radiator; the thermostat or a valve coupled to the thermostat is either open, allowing full flow of fluid between the radiator and the engine block, or is closed, totally restricting such flow. In contrast, in accordance with one embodiment of the invention, a variable flow thermostat is provided that allows the flow of coolant fluid from the engine block to the radiator to be varied in response to the sensed temperature of the engine coolant. Variable flow thermostats, in accordance with the invention, also find use in other applications. Although the various embodiments of the invention will be described herein as they apply to internal combustion engines, such description is merely for convenience and is not intended to limit the scope or application of the invention.

Figure 1:
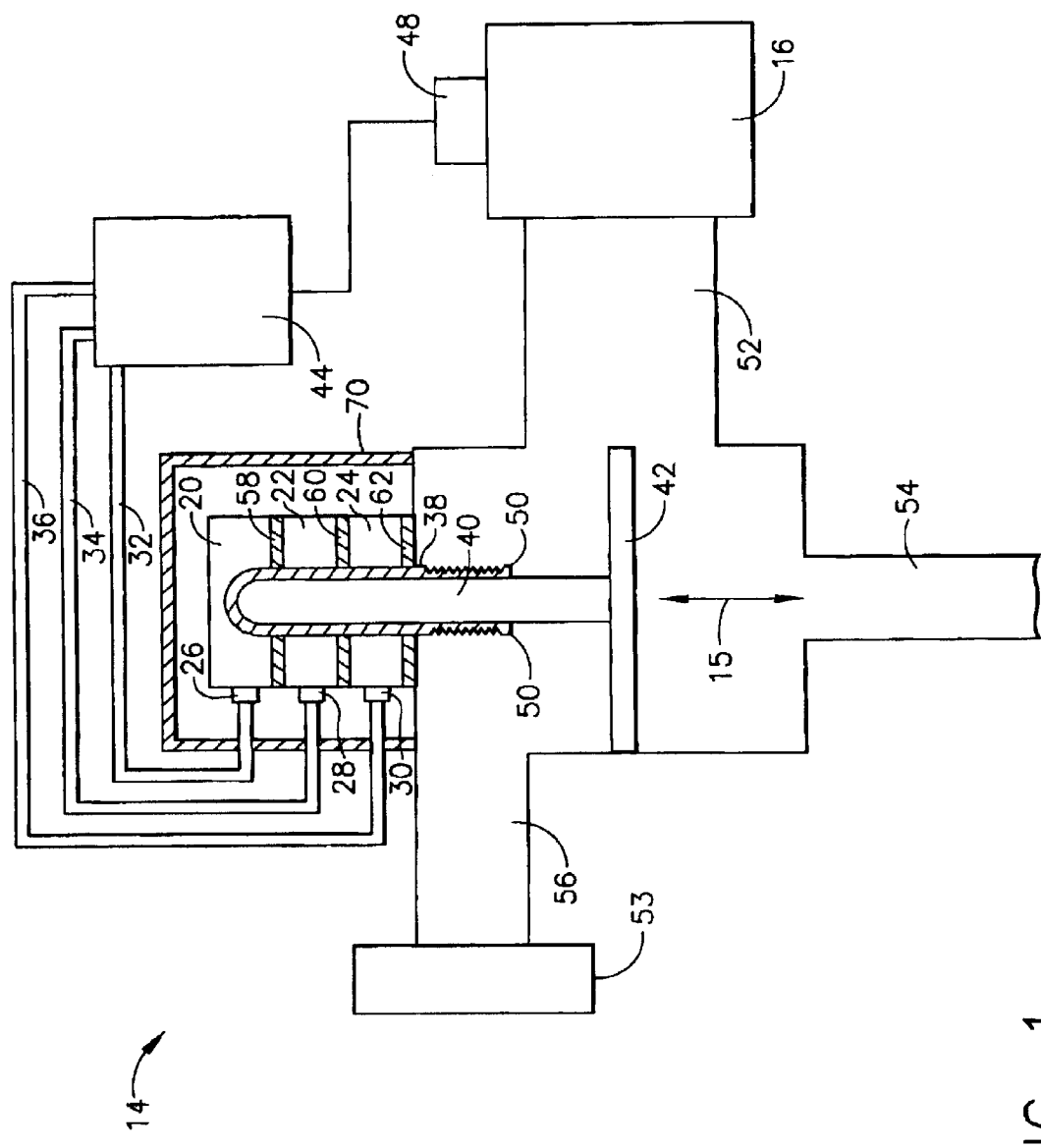
FIG. 1 illustrates schematically, in cross section, a variable flow thermostat in accordance with one embodiment of the invention.

FIG. 1 illustrates schematically, in cross section, a variable flow thermostat 14 in accordance with one embodiment of the invention. Thermostat 14 includes a valve 42 configured to move in a vertical direction as indicated by the double-ended arrow 15. As the valve moves vertically, the valve controls the amount of coolant fluid that flows from the engine block (illustrated schematically at 16) through a conduit 52 to either a bypass conduit 54 that recirculates the coolant fluid back to the engine block or to a radiator 53 through a conduit 56. The degree to which the valve is open (that is, the vertical position of the valve) determines the amount of coolant fluid that is recirculated and the amount of coolant fluid that is conveyed to the radiator where it is cooled before being recirculated to the engine block.

In accordance with an embodiment of the invention, the position of valve 42 is controlled in response to the temperature of the engine coolant monitored at the engine block. A temperature sensor 48 such as a thermister, thermocouple, temperature sensitive semiconductor device, or the like senses the temperature of the engine coolant and produces a signal proportional to the measured temperature. The signal produced by the temperature sensor is conveyed to a control system 44. Control system 44 can be, for example, a microcontroller unit (MCU), computer, part of the engine control module, or the like that responds to the signal from the temperature sensor. The control system can be programmed, in known manner, to control the engine temperature in a desired range. In accordance with one embodiment of the invention, the control system, in turn, controls the state of blocks 20, 22, 24 of an expandable medium by sending a signal through electrical leads 32, 34, 36, to control heaters 26, 28, 30, respectively, in contact with the blocks of expandable medium. In accordance with the illustrated embodiment, three blocks of the expandable medium are used, although a greater or lesser number of blocks could be used depending upon the particular application. The expandable medium can be any material that expands in a repeatable manner when heated and contracts back to its normal volume when not heated. For example, the expandable medium can be a wax that is used in conventional internal combustion engine thermostats, which expands as it is heated and melts and contracts back to its original volume when not heated, although any controllably expandable medium may be used. If such a wax is used, the expansion characteristics of the material can be tailored for the particular application, if necessary, by the addition of additive filler materials such as particles of metal, carbon, oxides, or the like. Without loss of generality and without limitation, the blocks of expandable medium will hereafter be referred to as blocks of wax. Each wax block 20, 22, 24 is provided with a control heater 26, 28, 30 (which, in turn, will have its own electrical leads connecting it to the control system). The control heaters can be, for example, electrical resistance heaters. The wax blocks are separated by thermally insulating material 58, 60, 62 so that the temperature of each wax block can be independently controlled. A thermally insulating material 70 also surrounds the wax blocks to thermally isolate the blocks from ambient temperature and especially from the temperature of the engine block.

Valve 42 is connected to a vertically oriented rod 40. Bushings, or the like, (not illustrated) may be used to maintain the proper orientation of the rod. The upper end of rod 40 passes through the wax blocks and is separated from the wax blocks by a flexible thermally insulated shield 38. One or more springs 50 bear against the rod and bias it in an upward position. The vertical position of rod 40 is thus controlled by the state of the blocks of wax and springs 50. The position of rod 40, in turn, controls the position of valve 42, and hence controls the amount of fluid that circulates between the engine block and the radiator.

In the embodiment of the invention illustrated schematically in FIG. 1, wax blocks 20, 22, 24 are arranged on top of each other and surround rod 40. When the wax blocks are solid (not melted) they are in their least expanded, lowest volume state and springs 50 maintain the rod in its fully upward position. With rod 40 in its fully upward position, valve 42 is also in its fully upward position closing off conduit 56 connected to the radiator, so that the bypass flow conduit 54 is fully open. As temperature sensor 48 senses the temperature of the engine coolant and relays a signal indicative of the sensed temperature to control system 44, the control system sends a signal to the control heater 26 on the topmost block of wax 20. The control heater heats up and melts the block of wax, causing the wax material to expand. Thermally insulating material 70 or other rigid material can be positioned about the top and sides of the wax blocks so that, when the wax melts and expands, the expanding wax "pushes" on insulating shield 38. The expanding wax exerts a downward force against insulating shield 38, which in turn exerts a downward force against the rod. As the rod is forced downward by the insulating shield, valve 42 is also forced downward. As valve 42 is forced down, conduit 56 connected to the radiator is partially opened, allowing a predetermined amount of coolant from the incoming conduit 52 to flow through the conduit 56 with the remainder of the coolant continuing to flow through bypass flow conduit 54. With valve 42 partially open in this manner, the engine will stabilize at a given temperature in response to the limited amount of coolant flowing through the radiator. If a lower engine temperature is desired, the control unit, in response to the temperature sensed by temperature sensor 48, can send a second signal to second control heater 28 causing that control heater to heat wax block 22. At the same time, the control unit continues to send a signal to control heater 26 so that wax block 20 remains melted. The second control heater then heats, and second block of wax 22 is melted, causing the molten wax to expand and exert a further downward force on the insulating shield, which in turn exerts a further downward force on the rod. This additional force on rod 40 causes valve 42 to open further and allows an increased proportion of the coolant fluid to flow into conduit 56 connected to the radiator and to partially block bypass flow conduit 54. Thus, an even greater amount of coolant flows to the radiator with the remainder of the coolant being routed to the bypass conduit. If, based on the signal from the temperature sensor, the control system senses full cooling is needed, the control system sends a third signal to third control heater 30 (while still sending signals to control heaters 26 and 28), causing third control heater 30 to heat and melt third block of wax 24. The melting wax block 24 expands and exerts a still further force on the insulating shield, causing it to force the rod down to its lowest position. The rod in turn forces valve 42 to its lowest position, where the valve closes the bypass flow conduit and diverts all incoming coolant fluid flow to the conduit connected to the radiator. In this way, the thermostat can variably control the amount of flow diverted from the incoming coolant conduit to either the conduit connected to the radiator or to the bypass flow conduit based on the temperature sensed at the engine.

The control unit can continuously receive signals indicative of the engine temperature from the engine temperature sensor. Based on those signals, the control unit can adjust the amount of heating by the three control heaters 26, 28, 30 to adjust the engine temperature to a desired value. By adjusting the amount of heating by the three control heaters, the melting and expansion of the three wax blocks 20, 22, 24 can be adjusted. Controlling the expansion of the wax blocks in turn controls the downward force exerted on rod 40 and the degree to which valve 42 is opened. For example, if the control unit determines that less engine cooling is desired, the signal to one of the heaters that is currently active can be terminated to cause the block of wax associated with that heater to cool. When that block of wax cools, the wax will contract and decrease in volume, reducing the downward force exerted on rod 40. Springs 50 pressing on the rod will force the rod upward, partially closing valve 42.

As a specific example, if the thermostat, as embodied in FIG. 1, is in a position to provide maximum cooling (all three control heaters active, all three blocks of wax melted, with the valve in its fully downward or opened position), and the control unit receives a signal from the temperature sensor indicating a temperature that is lower than the desired program temperature, the control unit sends a signal to control heater 30 causing that heater to turn off. The control unit can at the same time continue sending signals to control heaters 26 and 28 maintaining those heaters in the active state and maintaining the molten states of wax blocks 22 and 20. Wax block 24, when no longer heated by control heater 30, will solidify and contract, reducing the force exerted against the insulating shield, and in turn reducing the downward force on the rod. With the downward force on the rod reduced, springs 50 biases the rod upwardly, forcing the valve to partially open the bypass flow conduit and to divert a prescribed volume of coolant flow from the conduit connected to the radiator to the bypass flow conduit. With less coolant fluid flowing to the radiator, the engine temperature will increase.

In contrast, if the control unit senses, based on the signal from the temperature sensor, that more engine cooling is necessary, the control unit can send a signal to one of the non-active control heaters, causing the heater to heat and melt its associated wax block. If any of the other wax blocks are also melted, the control unit will continue to send signals to the control heaters associated with those respective wax blocks to maintain those blocks in their melted state.

Figure 2:
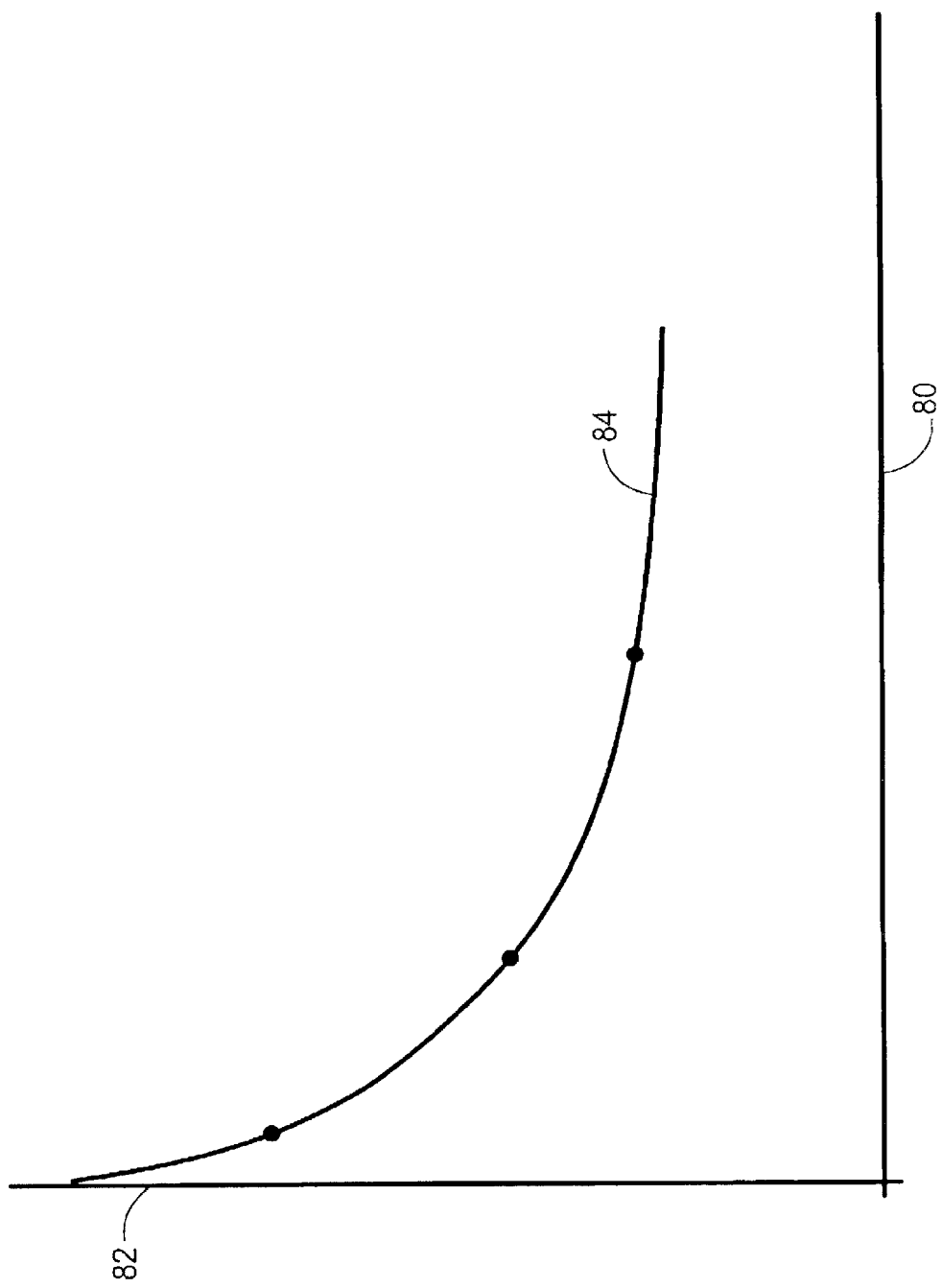
FIG. 2 illustrates graphically the correspondence between engine temperature and degree to which the thermostat permits flow of coolant fluid from an engine to a coolant radiator.

FIG. 2 illustrates, in graphical form, engine temperature as a function of percent flow of coolant fluid from the engine block through a coolant radiator achievable with a variable flow thermostat in accordance with one embodiment of the invention. The percent of fluid flow through the coolant radiator is represented along horizontal axis 80. Engine temperature is indicated along vertical axis 82. Curve 84 indicates the resulting engine temperature as a function of the amount of flow through the radiator.

In accordance with a further embodiment of the invention, the temperature of an engine can be controlled in variable manner by the use of a variable flow thermostat. Using such a variable flow thermostat, an algorithm controlling the control unit can be programmed in such a manner to maintain the temperature of the engine at any desired level, either constant or variable with time. For example, the control unit can be programmed to keep the engine at a static 90° C. for the entirety of its operation (after an initial warm up). The control unit could also be programmed, for example, in a way to initially allow the engine to attain a very high temperature at startup in order to reduce emissions, and then allow the engine to cool down to a prescribed, static temperature as time progresses. Other temperature program schemes, of course, are possible, depending on desired engine operating conditions.

Once a desired operating temperature or progression of operating temperatures are determined, such temperatures are programmed into the control unit. The control unit is then programmed to initiate activation of control heaters such as control heaters 26, 28, 30 to achieve the desired amount of coolant flow through a coolant radiator in accordance with an engine cooling function such as illustrated in FIG. 2. Programming of the control unit can be done in conventional manner, depending on the type of controller used. Depending on the desired engine temperature, perhaps as a function of time, the control unit activates one or more of the control heaters to melt and cause expansion of one or more of the wax blocks. The expansion of the melted wax blocks exerts a variable force, depending on the number of wax blocks melted, on control rod 40. The control rod, in turn, exerts a variable force on valve 42 and controls the degree to which the valve is open and the percentage of fluid coolant that is conveyed to the coolant radiator and the fluid coolant that bypasses the radiator and is recirculated directly to the engine block. Control of the control heaters by the control unit can be varied with time to either increase or decrease the number of wax blocks that are melted to either increase or decrease the percentage of coolant flow that passes through the coolant radiator.

Thus, it is apparent that there has been provided, in accordance with the invention, a variable flow thermostat and a method for variably controlling the temperature of an engine using such a thermostat that fully meets the needs set forth above. Although various embodiments of the invention have been set forth with reference to particular embodiments thereof, it is not intended that the invention be limited to such illustrative embodiments. For example, more or fewer blocks of wax can be employed, thermally expandable materials other than wax can be used, and the blocks of wax can be melted in different order than the order illustrated. Those of skill in the art will recognize that these and many other variations and modifications of such embodiments are possible without departing from the spirit of the invention. Accordingly, it is intended to be included within the invention all such variations and modifications as fall within the scope of the appended claims.

What is claimed is:

1. A variable flow thermostat comprising:
    an adjustable valve configured to control flow of a fluid through a fluid conduit in response to a sensed temperature;
    a control rod coupled to the adjustable valve to control the opening of the adjustable valve and to thereby control the flow of the fluid;
    an expandable medium positioned to convey a force against the control rod;
    an electrical heating element positioned to controllably heat the expendable medium causing the medium to expand and to convey a force against the control rod and to thereby cause movement of the control rod;
    a temperature sensor capable of producing a signal in response to the sensed temperature;
    a flow controller coupled to the electrical heating element to control heating of the electrical heating element in response to the signal from the temperature sensor; and
    wherein the expandable medium comprises a plurality of blocks of expandable medium.

2. The variable flow thermostat of claim 1 further comprising a thermal insulator separating the plurality of blocks of expandable medium.

3. The variable flow thermostat of claim 1 wherein the electrical heating element comprises a plurality of electrical heating elements, each of the plurality of heating elements associated with one of the plurality of blocks of expandable medium.

4. The variable flow thermostat of claim 1 wherein each of the plurality of blocks of expandable medium comprises a wax compound.

5. The variable flow thermostat of claim 4 wherein each of the plurality of blocks of expandable medium comprises a wax compound with an additional filler material.

6. The variable flow thermostat of claim 1 wherein the plurality of blocks of expandable medium comprise three blocks of a wax material with a thermal insulator between adjacent blocks of wax material.

7. The variable flow thermostat of claim 1 wherein the expandable medium is configured to surround an upper extremity of the control rod.

8. The variable flow thermostat of claim 7 further comprising an insulating shield separating the expandable medium from the extremity of the control rod.

9. The variable flow thermostat of claim 8 wherein the insulating shield and the expandable medium are configured such that upon expansion of the expandable medium, the expandable medium exerts a force upon the insulating shield and the insulating shield exerts a force upon the control rod.

10. The variable flow thermostat of claim 1 wherein the adjustable valve is configured to proportion flow of a coolant fluid to a bypass conduit and to a conduit connected to a radiator.

11. The variable flow thermostat of claim 1 further wherein the sensed temperature is the temperature of fluid coolant in an engine block.

12. The variable flow thermostat of claim 11 further comprising a thermal insulator thermally isolating the expandable medium from the engine block.

13. A method for variably controlling the temperature of an engine comprising the steps of:
    sensing engine coolant temperature and producing a signal proportional to the engine coolant temperature;
    providing a variable flow valve having a plurality of opening states, each capable of passing a different predetermined flow of coolant fluid from the engine to a coolant radiator;
    providing a plurality of blocks of an expandable medium, each of the blocks capable of causing exertion, upon expansion, of a force upon the variable flow valve; and
    controlling the variable flow valve by electrically heating at least one of the blocks of expandable medium in response to the signal.

14. The method of claim 13 wherein the step of providing a plurality of blocks comprises the step of providing a plurality of blocks of a thermally expandable wax material.

15. The method of claim 14 wherein the step of providing a plurality of blocks comprises the step of providing a plurality of blocks of an expandable medium, each positioned to exert, upon expansion thereof, a force against a control rod coupled to the variable flow valve.

16. A variable flow thermostat for an internal combustion engine comprising:

an adjustable valve configured to control the flow of a coolant fluid from an engine block to a coolant radiator;

a control rod coupled to the adjustable valve, the control rod movable in response to a force exerted thereupon to control the opening of the adjustable valve to thereby control the flow of coolant fluid to the coolant radiator;

a temperature sensor positioned to detect temperature of the engine coolant and to produce an electrical signal in response to the temperature detected;

a plurality of blocks of thermally expandable medium, each block of the plurality of blocks positioned to convey a force to the control rod in response to such each block being heated to a sufficient temperature to cause expansion of such each block;

a plurality of control heaters, each of the control heaters positioned in proximity to one of the plurality of blocks of thermally expandable medium and capable of heating such one of the plurality of blocks to cause thermal expansion there of; and a control unit coupled to receive the electrical signal from the temperature sensor and coupled to the plurality of control heaters to cause the heating of at least one of the plurality of control heaters in response to the reception of the electrical signal.

17. The variable flow thermostat of claim 16 wherein the plurality of blocks of thermally expandable medium is positioned to surround a portion of the control rod.

18. The variable flow thermostat of claim 17 further comprising an insulated shield positioned between the plurality of blocks of thermally expandable medium and the portion of the control rod.

19. The variable flow thermostat of claim 18 further comprising thermal insulators positioned between adjacent ones of the plurality of blocks of thermally expandable medium.

20. The variable flow thermostat of claim 18 further comprising thermal insulator positioned to thermally insulate the plurality of blocks of thermally expandable medium from the engine block.

* * * * *